June 11, 1935.  F. HAGER  2,004,695

HANGER FOR CABLES OF OVERHEAD LINES

Filed July 9, 1934

F. Hager INVENTOR

By Marks & Clerk ATTYS.

Patented June 11, 1935

2,004,695

UNITED STATES PATENT OFFICE 2,004,695

HANGER FOR CABLES OF OVERHEAD LINES

Fritz Hager, Berlin, Germany

Application July 9, 1934, Serial No. 734,345
In Germany February 20, 1932

3 Claims. (Cl. 248—61)

My invention relates to hangers for cables of overhead lines.

It is an object of my invention to provide a hanger by which cables and suspension wires of various diameters are firmly and permanently connected.

Hangers as designed heretofore have the drawbacks that the connection accomplished by them is not firm, or that it is not permanent.

These drawbacks are eliminated by the hanger according to my invention. The hanger which is preferably made of sheet metal, has a central portion or eye by which it is supported on the suspension wire, and a pair of shanks which are connected to, and normally integral with, the central portion. The free lower ends of the shanks are equipped with jaws for engaging the cable, and a member is mounted to slide on the shanks for forcing the jaws against the cable from opposite sides.

In a preferred embodiment of my invention, the two shanks have each a longitudinal slot for the reception of a sliding member or tensioning key, and the jaws at the lower ends of the shanks have oppositely inclined cable-engaging parts. By these means, the clip formed by the two jaws, is able to receive cables of various diameters which are firmly and permanently held by operation of the key.

The key preferably has the shape of the letter I, i. e., it comprises a central comparatively narrow portion, with wider lugs at both ends. A key of this type may be threaded through the longitudinal slots of the shanks, and then turned for about 90°, so that its lugs bear on the shanks. Preferably, wedges are provided at the sides of the shanks, and, preferably, the wedges are equipped with teeth to be engaged by the lugs on the key, so that shifting of the key, and loosening of the connection between the cable and the hanger is prevented.

When assembling the line, it is not necessary to thread the cable through the hangers, but the cable is laid out and inserted in the open clips at the lower ends of the hangers from below, whereupon the keys of the hangers are operated for clamping the cable between the jaws of the shanks. The cable is held so firmly that its lead sheath can not be damaged by friction. A hanger of a given size may be used for cables of widely different diameters which it receives and holds firmly. Slipping of the cable from the clip is prevented by the initial tension which is effected by the key.

In the accompanying drawing, a hanger made of sheet metal and equipped with toothed wedging members, is illustrated by way of example.

In the drawing

Figure 1:
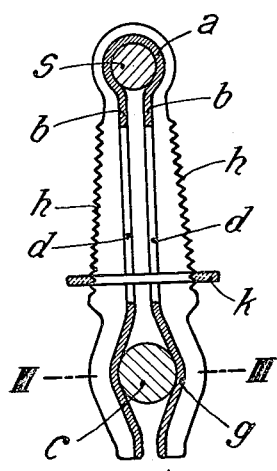
Fig. 1 is a transverse section of the hanger, taken on the line I—I in Fig. 2.
Figure 2:
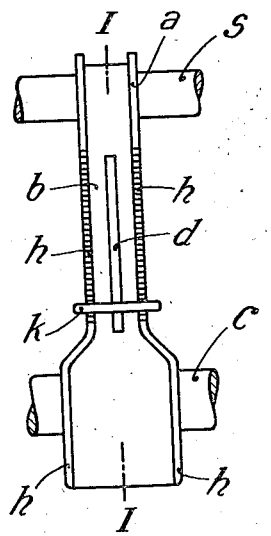
Fig. 2 is a side elevation of the hanger.

Referring now to the drawing, the hanger which, as mentioned, is forged from sheet metal in the example illustrated, has, at its upper end, a central open loop forming an eye $a$ for the reception of the suspension wire S. The inside diameter of the eye is so determined that it closely engages the suspension wire of the size which is prescribed for a cable of given diameter, and it will engage the suspension wire S the more firmly, the smaller the diameter of the cable C. Connected to, or, as illustrated, integral with, the central portion or eye $a$ are two shanks $b$ which are slotted longitudinally at $d$. The free lower ends of the shanks are formed as jaws with oppositely inclined or V-shaped cable-engaging parts $g$. These parts serve for the reception of the cable C.

Figure 3:
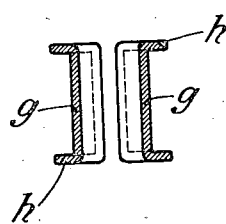
Fig. 3 is a section of the hanger, taken on the line III—III in Fig. 1.

For bracing the hanger, the sides of its shanks $b$ are equipped with flanges $h$ which extend from the eye $a$ down to the jaws $g$. That portion of the flanges $h$ which is between the eye $a$ and the jaws $g$, slopes from the eye toward the jaws, so that the flanges form wedging members whose outer edges may be toothed, as shown. The lower portions of the flanges brace the jaws $g$, as best seen in Fig. 3. While the side faces of the shanks are kinked sharply, they are curved to a larger radius between the jaws $g$, as shown in Fig. 1, in order to prevent damage to the cable which might result from sharp angles where the jaws or parts $g$ merge into each other.

Figure 4:
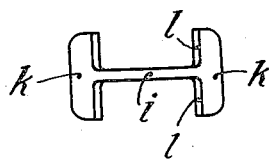
Fig. 4 is a plan view of the key.
Figure 5:
Fig. 5 is an elevation of the key.

In operation, the hanger is placed on the suspension wire S with its eye $a$, the cable is inserted between the parts of the jaws, and the key $i$, Figs. 4 and 5, is inserted in the slots $d$. The key has a narrow central portion and lugs $k$ at both ends which project at opposite sides of the central portion. The inner faces of the lugs have teeth $l$ for engaging in the toothed edges of the flanges $h$. The key is threaded through the longitudinal slots $d$ with its lugs $k$ in vertical position, as described. Then it is turned through 90° so that its lugs are now in horizontal position, and able to cooperate with the teeth on the flanges $h$. The key is now shifted in the longitudial slots and the cable is compressed by the wedging action of the sloping members of the flanges. The key is held in its final position by engagement of its teeth $l$ with the teeth of the flanges $h$. By these means, the eye $a$ is fixed on the suspension wire $S$, and the cable $C$ is firmly held between the parts $g$ of the jaws.

I claim:

1. A hanger for cables of overhead lines comprising an open loop forming an eye adapted to engage a suspension wire, opposing shanks continuing from the ends of the loop, opposing jaws carried by the lower parts of the shanks adapted to engage a cable extending between said jaws, and means for forcing the shanks together to clamp the loop on to the suspension wire and to clamp the cable between the jaws.

2. A hanger for cables of overhead lines comprising an open loop forming an eye adapted to engage a suspension wire, opposing shanks continuing from the ends of the loop, opposing jaws carried by the lower parts of the shanks adapted to engage a cable extending therebetween, at least one of said shanks having outwardly projecting longitudinal flanges provided with serrated edges diverging outwardly from the longitudinal axis of the hanger towards the lower end thereof, and a key having slidable engagement with both shanks and adapted to engage the diverging serrated edges of the flanges so that adjustment of the key toward the lower end of the hanger operates to force the jaws together for securing the cable and to clamp the loop around the engaged suspension wire.

3. A hanger for cables of overhead lines comprising an open loop forming an eye adapted to engage a suspension wire, opposing shanks continuing from the ends of the eye, opposing jaws carried by the lower end parts of the shank adapted to engage a cable extending through said jaws, each of said shanks having a longitudinal slot extending between the loop and the jaw provided on the shank, each of the said shanks having oppositely and outwardly extending flanges along its longitudinal edges, each of said flanges having serrated edges diverging outwardly towards their lower ends from the longitudinal axis of the hanger, and a key extending through the longitudinal slots in the opposing shanks, said key having lugs projecting laterally from its ends to engage the diverging serrated edges of the flanges so that downward movement of the key in the slots operates to force the shanks together to clamp the loop around the engaged suspension wire and to clamp the opposing jaws on to the engaged cables.

FRITZ HAGER.